Nov. 19, 1946.  C. R. SOUTHWELL  2,411,300
MAP AND LOCATION FINDING MEANS THEREFOR
Filed Aug. 8, 1944   2 Sheets-Sheet 1

Inventor
Chas. R. Southwell
By T. R. Bryant
Attorney

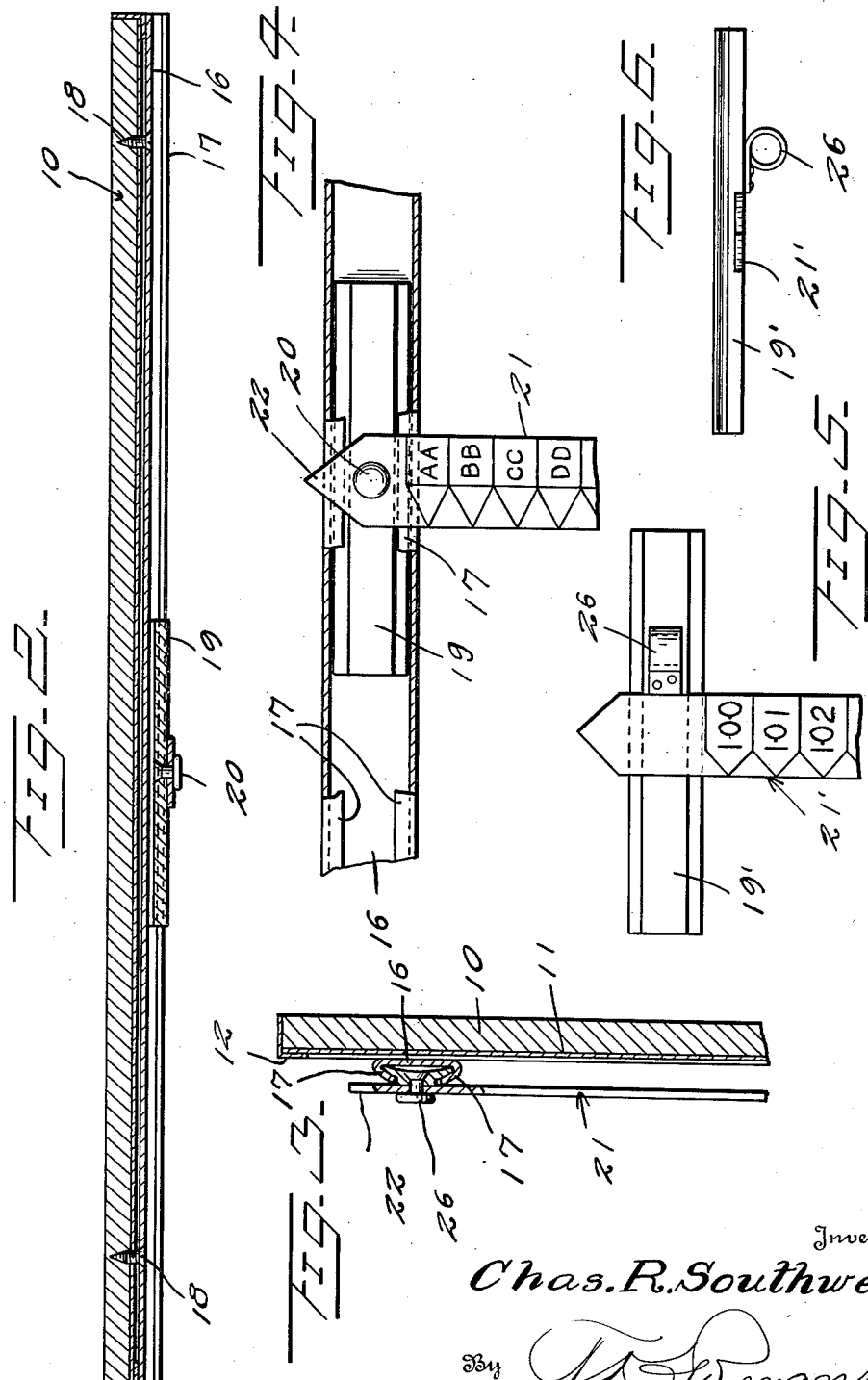

Patented Nov. 19, 1946

2,411,300

UNITED STATES PATENT OFFICE 2,411,300

MAP AND LOCATION FINDING MEANS THEREFOR

Charles R. Southwell, San Antonio, Tex.

Application August 8, 1944, Serial No. 548,602

3 Claims. (Cl. 35—40)

This invention relates generally to maps and more particularly to improvements in maps having associated therewith means for locating pre-selected places thereon.

In maps of densely populated areas the names of towns and villages or streets, if the map is of a city or town, must be printed in very small type if all of the places thereon are to be designated. This not only makes the map difficult to read but makes the map confusing and a great deal of time is required to locate a desired town, village, street or other place or object.

An object of the present invention is to provide an improved form of map with means associated therewith by which a pre-selected place thereon can be easily and quickly located.

Another object of the invention is to provide an improved map and location finder in which the location of a desired place thereon is accomplished by the use of cooperating key scales, one such key scale being associated with a movable straight edge which is positioned across the map between the fixed scales in accordance with key symbols set forth on an index of streets, towns, cities, public buildings or other places, forming a part of the map structure, or accompanying the map.

Still another object of the invention is to provide an improved map form and position locating means, in which said means is attached to the map so that it may be easily and quickly shifted from one position to another across the face of the map between opposite scales, to locate a pre-selected place on the map.

The invention will be best understood from a consideration of the following detailed description taken in connection with the accompanying drawings, with the understanding that minor changes or alterations may be made in the structure so long as such changes do not depart from the spirit of the invention as expressed in the appended claims.

In the drawings:

Figure 2 is a sectional view taken on line 2—2 of Figure 1.

Figure 3 is a fragmentary section taken on line 3—3 of Figure 1.

Figure 4 is a detailed view of the connection between the slide and guide for the straight edge, the figure being on an enlarged scale with parts broken away.

Figure 5 is a view in plan of a modified form of slide and straight edge bar.

Figure 6 is an edge view of the modification shown in Figure 5.

Figure 1:
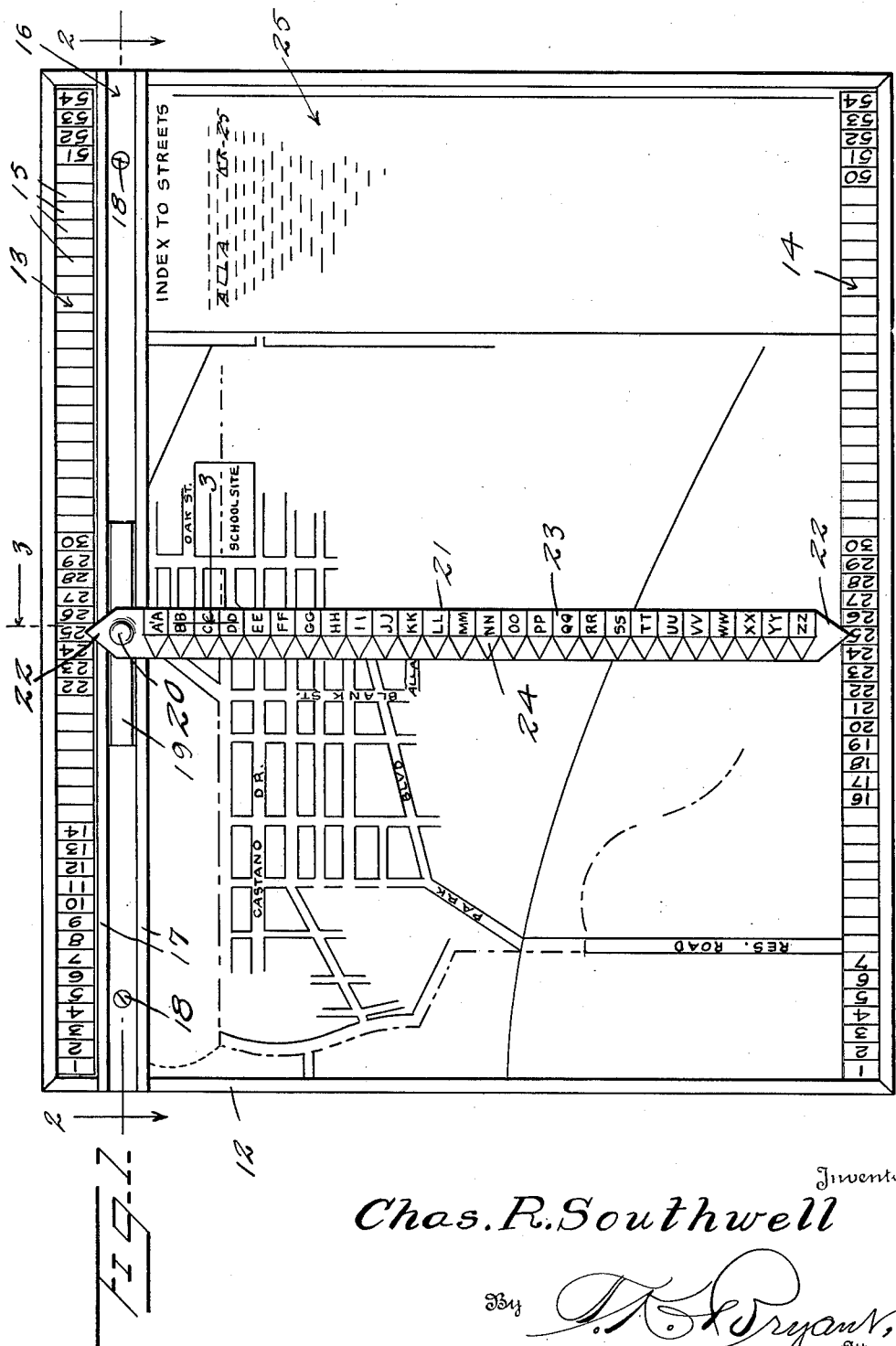
Figure 1 is a view in plan of a map and position locator or finder constructed in accordance with the present invention.

Referring now more particularly to the drawings, there is illustrated a map structure comprising a base or back-body 10 to the face of which is secured the map sheet 11. This map is here shown as being a map of a city or a portion of a city but it is to be understood that it may be a map of a state, a country or a hemisphere, a chart, or of anything else in connection with which a diagram might be used.

The numeral 12 designates a border frame which may be employed for protecting the edges of the map sheet but this feature is not essential as it will be readily obvious that, instead of the map being mounted upon a supporting board as illustrated, it may be fixed to a wall or it may be printed directly upon a heavy body of cardboard or any other material of sufficient weight or stability to have the hereinafter described elements attached thereto.

In accordance with the present invention the map has formed along the top and bottom edges the scales 13 and 14. At least one of these scales or successions of indications is spaced from the main body or field of the map or chart as to permit the latter to present the complete map area in exposed condition in presence of the indicating instrumentality presently described in detail. These scales are shown as being divided transversely into a series of small squares or blocks 15, in each of which is a suitable key character here shown as numerals running consecutively from one end of the scale to the other. The squares or blocks 15 are of uniform width dimension, thus providing uniformity, while the succession of indications—the key characters—are similar in type but differ from each other to thereby permit localization of the indicating instrumentality. The successions of indications extend in parallelism in opposite marginal zones of the map or chart—shown as at the top and bottom zones of the latter—with the intervening space preferably at the top of the map or chart field.

Supported on the border frame 12 is a locater-instrumentality composed of a number of elements which will now be described:

Secured across the face of the map sheet either at the top or at the bottom, adjacent to and parallel with the inner side of the scale, is a guide bar or way 16, having the longitudinal inturned edge flanges 17. Any suitable securing means may be employed such as the screws 18 for holding the guide in position.

Engaged between the guide flanges 17 is a traveller in the form of a runner or slide plate 19, which is adapted to move freely lengthwise of the guide bar. This slide carries a pivot pin or stud 20 which passes through one end of and pivotally connects to the slide a straight edge bar or indication-carrying member 21. This bar is of sufficient length to extend entirely across the map from one edge scale to the other and at each end the bar is pointed to form an arrow head of partial triangular type 22 which terminates over the adjacent scale and is employed to designate a numeral in one of the blocks 15.

The face of the straight edge bar is divided into a series of blocks 23 in each of which is located a reference key which is here shown as being composed of two letters although obviously any other symbol might be employed. At one side of each key block 23 an arrow of partial triangular type 24 is formed, the point of which comes to the edge of the bar so as to designate some selected place or object on the map, each block 23 having its individual arrow 24 with all of the latter having their apices at the same edge of member 21.

The partial triangular formations at the ends of member 21 and the similar form of the arrows 24, is of advantage in facilitating the proper location of the member and the position of the location being sought, whether the use is that of preparing the map tabulations of locations or in subsequent use of the prepared map. For purposes of clear legibility for rapid reading, the blocks which carry the successions of indications—whether the latter be the blocks of scales 13 and 14, or those on member 21—are sufficiently dimensioned to permit use of indications which can be rapidly distinguished, even under quasi-cursory conditions; hence, the width of the blocks may represent material distances on the map—depending upon the scale of distances of the latter—and it is important that member 21 be accurately positioned and the indications on the member give a clear indication of the vicinity of the location under rapid-inspection conditions. The angular formations aid in this service—whether the latter be in map preparation or in subsequent reading—since the symmetrical appearance of the sides of the angles leading to the apices enables the user to rapidly position member 21 and then find the vicinity of the desired map location point. In addition, such shape is especially advantageous for this reason, where member 21 is pivoted, as in Fig. 1, since it is then essential that both ends of the member be properly positioned, a condition which can be quickly detected by the user when this shape is employed.

In addition, the fact that each of the indications on member 21 has its individual direction indicator leading to the defining edge of the member, provides definite advantages to the user, since he need only to visually isolate the specific indication noted on the tabulated locations, the apex of the direction indicator of the isolated indication located at the defining edge of the member immediately presenting the vicinity of the location being sought, with the sides of the triangular formation indicating the range of the vicinity—whether the apparatus is being used in developing the tabulation of locations or seeking a tabulated location.

Associated with the map in any convenient manner is an index of the places or objects in the map. This index is here illustrated as being formed along the right hand side of the map and is generally designated 25, although obviously it may be placed in any other suitable or convenient location and might even form a separate unit such as a sheet, card or booklet.

Each of the places tabulated in the index has beside it a combination of key letters and numbers to be used in positioning the straight edge bar across the face of the map for the purpose of quickly locating a selected place. For example, the map here shown is of a portion of a town or a city in which the different streets are designated, together with building locations and other objects. If it should be desired to locate the street named "Alta," for example, the user of the map finds this name in the index and notes the key symbols beside it which are "KK-25." He then moves the slide 19 until the upper point of the bar 21 is at block 25 in the scale 13 and brings the lower point of the bar to the same number in the bottom scale. He then locates the block designated "KK" on the face of the bar and finds the desired street indicated by the arrow head adjacent to this last symbol.

Where the map may be of a section of the country which is densely populated the more important cities or towns may have their names printed on the face of the map and the smaller towns or villages may be designated by any arbitrary symbol such as a circle, star or dot. The names of all the towns or villages would, of course, be listed in the index and thus when a desired town name is found in the index and the symbols associated therewith are employed as above described in the positioning of the bar 21, the location of the selected town will be immediately designated even though such town location may only be represented on the map by a circle or in some other way, without the town name.

It is, of course, not necessary that the bar always be disposed perpendicular to the top and bottom edges of the map in using it for the location of a particular place or object thereon, as it will be readily apparent that certain places or objects might lie in such a position as not to be designated by the point of any one of the arrows or pointers 24 when the bar is perpendicular to the top edge of the map. In such case it might be necessary for the key in the index to be made up of numbers or other symbols of unlike character in order to bring the necessary pointing arrow 24 into the proper position to designate the desired place or object. For example, the numbers given for use with the scales 13 and 14 might be respectively 25 and 23, so as to swing the bar sufficiently to bring the point of the arrow 24, associated with the designated symbol on the bar into proper position to locate the selected place or object.

In Figures 5 and 6 a modified construction of the runner and bar unit is shown. In this modification the runner which is designated 19' may be of exactly the same form as the runner 19 and the straight edge bar designated 21' may be of the same design or form as the bar 21 but instead of being pivotally attached, is countersunk into the top of the runner so as to be rigidly coupled therewith at right angles thereto. In order to facilitate the ready movement of this modified unit, without straining the joint between the bar and runner, there is provided the finger piece 26 which is secured to the face of the runner and is here shown as being in the form of a loop.

From the foregoing it will be readily apparent that the present invention provides a quick and easy means of locating any place upon a map or chart which is designated in the index associated therewith. It is to be understood that there are no limitations associated with the invention as to the type of map or chart with which the invention may be used or as regards the materials of which the map or chart, the runner guide or straight edge may be made.

I claim:

1. In means for isolating locations on maps, charts or the like, and in combination, a map, chart or the like bearing a succession of indications arranged with uniform spacing extending lengthwise of and within each of two opposite parallel zones generally marginal with respect to the field of the map or chart and with at least one of the zones spaced from the field, similar indications of the two zones being alined perpendicular to the direction of length of each of such successions; and a locater instrumentality positioned in overlying relation to the map or chart, said instrumentality including a frame surrounding the map or chart, a way supported by the frame and extending parallel to said map or chart successions and overlying the space between said field and the adjacent succession, a traveller mounted for movement lengthwise of the way, and an indication-carrying member supported by and movable with the traveller and normally extending substantially perpendicular to the direction of length of such way, said member having its opposite ends of angular shape to provide an apex and having a length such as to locate the apices in immediate proximity to the respective indication successions of the map or chart to permit accurate positioning of the member relative to predetermined individual indications, said member also having a defining edge and carrying a succession of uniformly-spaced indications with each of the latter having a directing indication of triangular shape having an apex at such edge, the succession of indications of the member differing in type from those of the map or chart; said means also including a tabulation of locations of the map or chart with each location carrying an identifying indication formed of specific indications of the map or chart and the member indication succession, a portion of the specific indication presenting the position of the angular ends of the member relative to the map or chart successions when the defining edge of the member is located in the immediate vicinity of the specific location with the remainder of the specific indication presenting the member succession indication in the immediate vicinity of the specfic location as indicated by its individual direction indication.

2. Means as in claim 1 characterized in that the way includes flanges overlying the traveller to thereby limit the traveller to movements rectilinearly.

3. Means as in claim 1 characterized in that the way includes flanges overlying the traveller to thereby limit the traveller to movements rectilinearly, and in that said member is mounted pivotally on the traveller with the pivot axis extending perpendicular to the direction of length of the traveller movements.

CHARLES R. SOUTHWELL.